United States Patent [19]
Goetz

[11] 3,774,868
[45] Nov. 27, 1973

[54] INTEGRATED NOZZLE
[76] Inventor: Gerald F. Goetz, 3235 South 152nd St., Seattle, Wash. 98188
[22] Filed: Dec. 11, 1972
[21] Appl. No.: 315,755

Related U.S. Application Data
[63] Continuation of Ser. No. 68,343, Aug. 8, 1970, abandoned.

[52] U.S. Cl. .......................... 244/53 R, 239/265.19
[51] Int. Cl... B64d 33/04, B63h 11/10, B64c 15/00
[58] Field of Search.................. 244/53; 239/265.19, 239/265.33, 265.37; 60/228, 229, 230

[56] References Cited
UNITED STATES PATENTS
3,570,247  3/1971   Denning et al. ............... 239/265.19
3,352,494  11/1967  Colville et al.................. 239/265.33
3,276,696  10/1966  Brandt........................... 239/265.37

Primary Examiner—Trygve M. Blix
Assistant Examiner—Charles E. Frankfort
Attorney—Glenn Orlob

[57] ABSTRACT

An aircraft engine exhaust nozzle system having thrust vectoring capability for use in flight path management, for in-flight thrust reversal or modulation, or for thrust reversal during landing; and which includes a variable area nozzle for improved propulsion efficiency. The preferred embodiment utilizes an exhaust passageway having a rectangular nozzle exit area for minimum base area, boattail, and interference drag. An aerodynamically shaped plug is centrally located in the path of the exhaust gases. The portion of the plug extending aft of the nozzle exit plane is used as a thrust vector control means and comprises a pair of oppositely facing surfaces which can be displaced for changing the flow pattern of the exhaust gases, thereby generating a thrust vector for use as a primary flight control in rotating the aircraft about one of its major axes. The oppositely facing surfaces can also be positioned for forward thrust modulation or for full reversal of the thrust vector. A portion of the plug extending forward of the exit plane provides for variable throat area control by displacement of plug surface panels to obtain a desired nozzle throat area and, independently, a passageway shape and exit area for improved propulsion efficiency.

6 Claims, 7 Drawing Figures

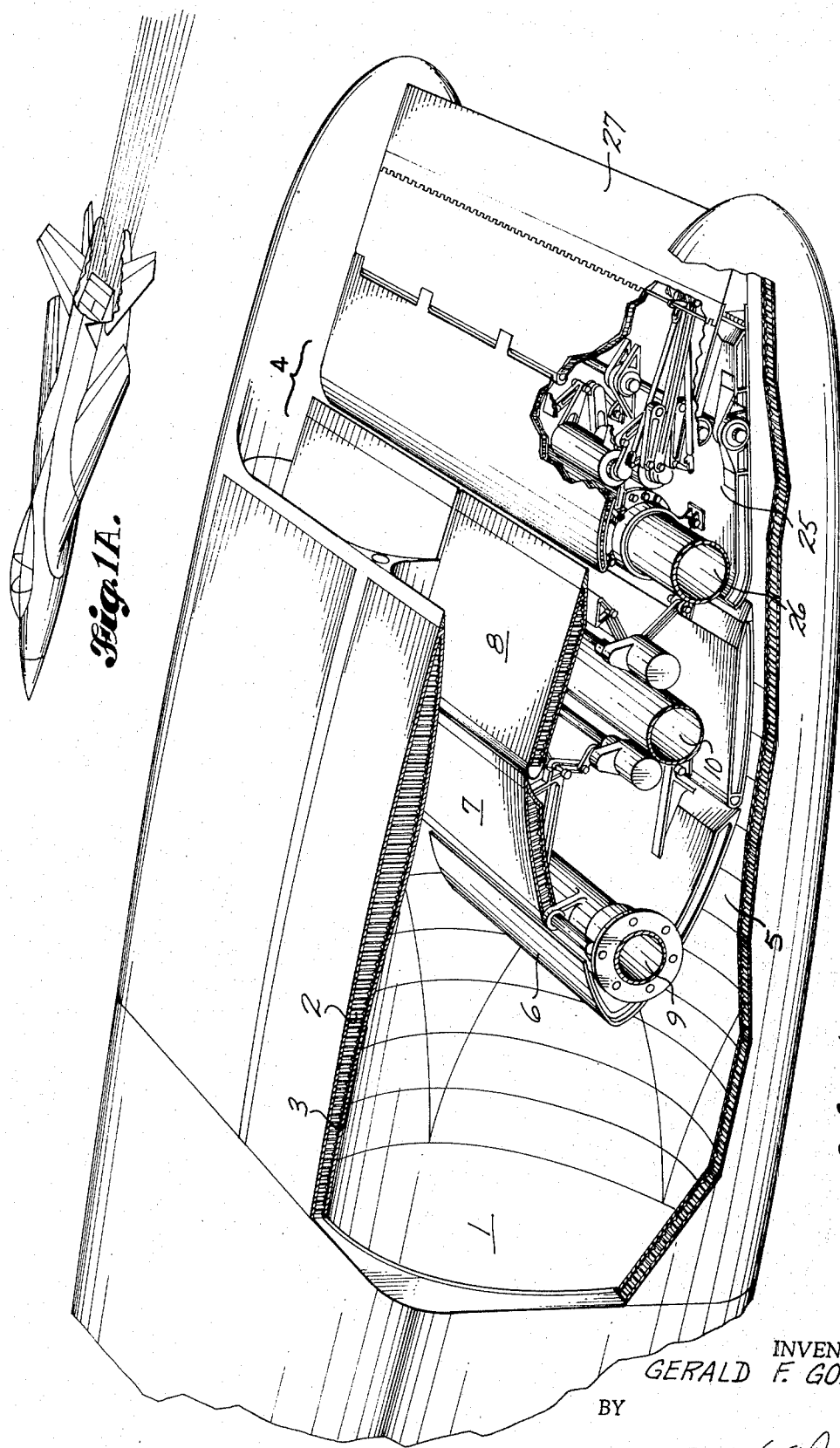

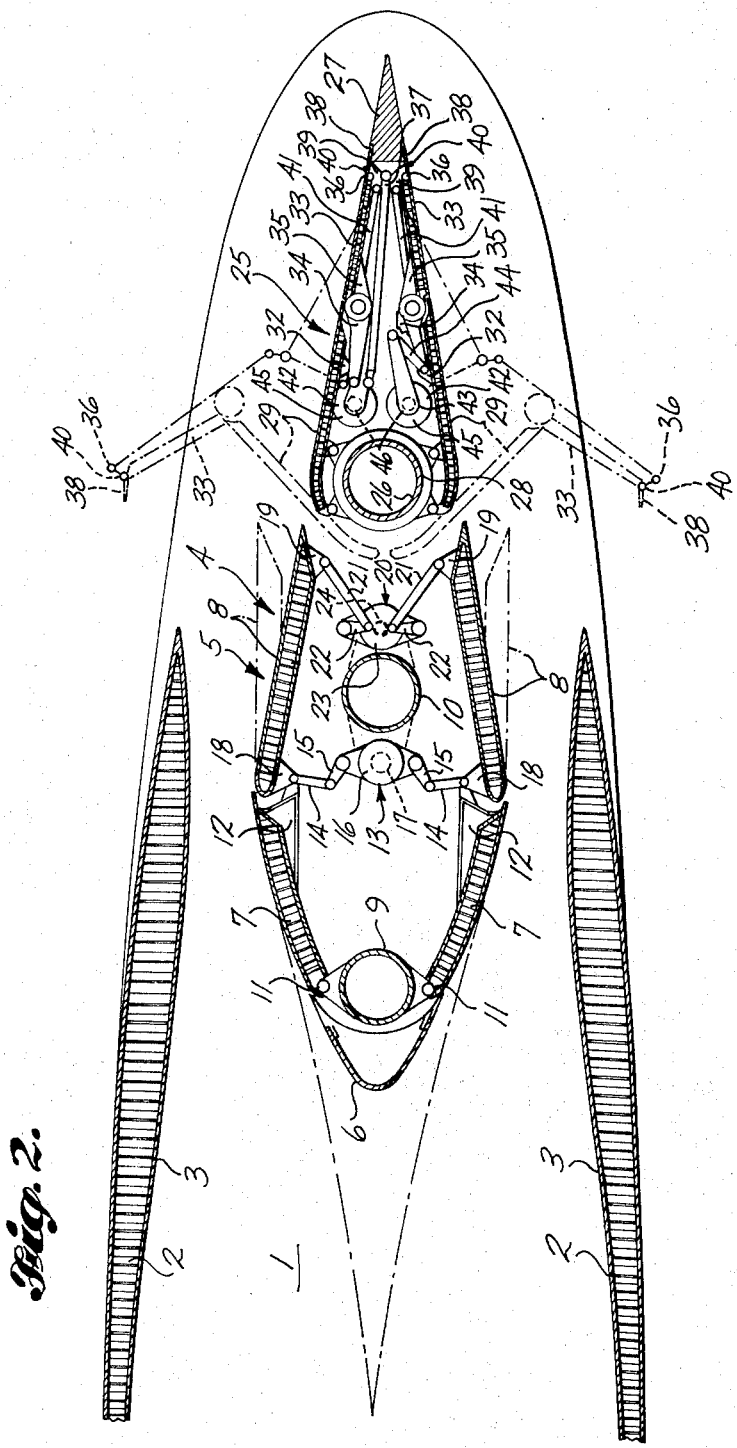

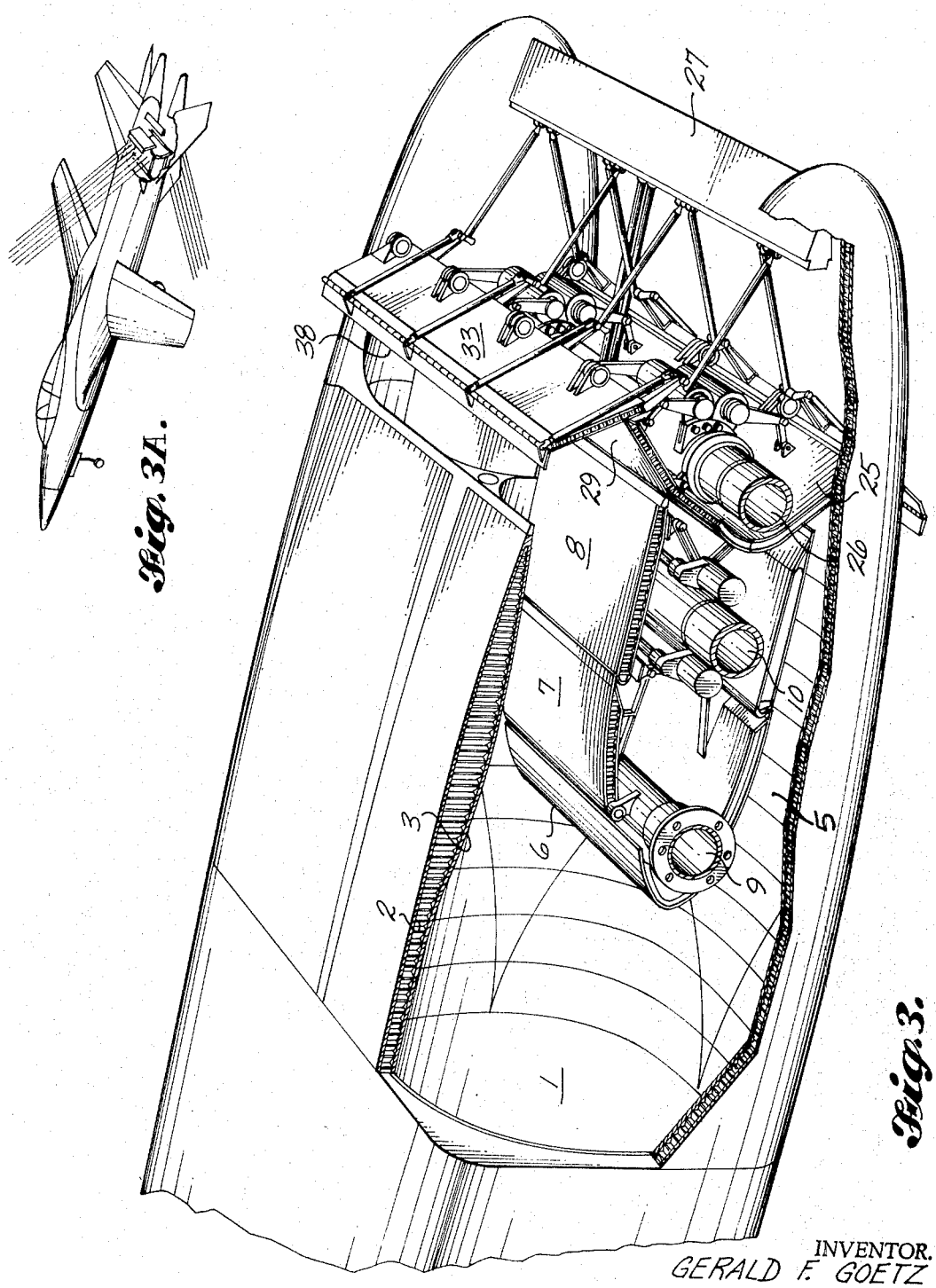

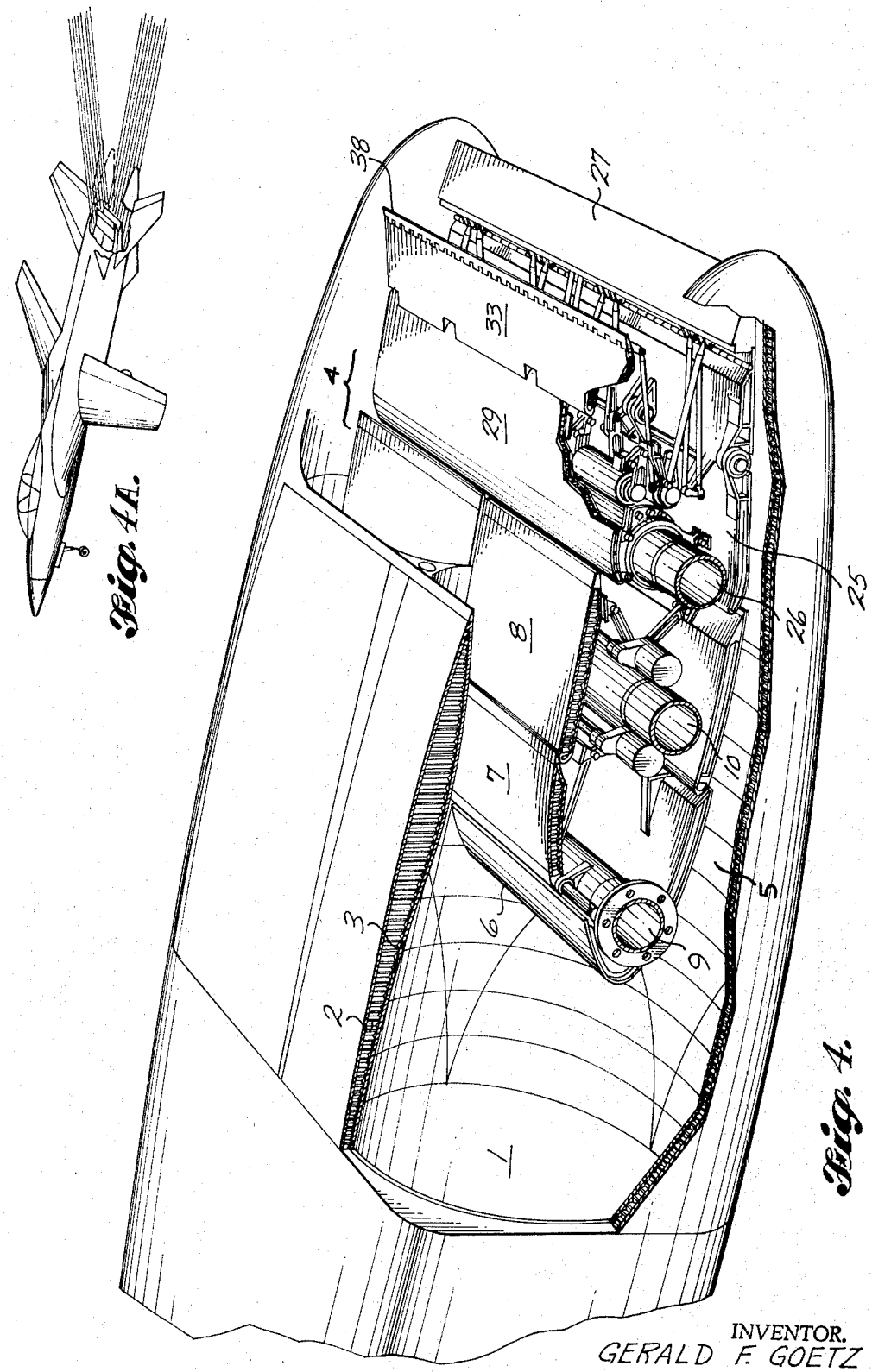

INTEGRATED NOZZLE

This is a Continuation of application Ser. No. 68,343, filed Aug. 8, 1970, now abandoned.

1. Field of the Invention

This invention relates to an exhaust system and nozzle configuration for aircraft jet propulsion engines; and, more particularly, to a deformable plug type rectangular nozzle incorporating thrust vectoring capability and a variable area nozzle passageway.

2. Description of the Prior Art

In the design of aircraft propulsion systems, nozzle base area, boattail and interference drag have traditionally been responsible for severe performance and range penalties. This has been particularly true in the case of axi-symmetric twin jet engine installations wherein a pair of generally cylindrical engines are mounted in a side-by-side parallel spaced relationship. In multi-jet engine systems, it has been customary to provide, and accept the weight penalty for, individual structural assemblies, and thrust reverser mechanisms for each engine. Such reverser mechanisms are normally functionally limited to use in ground roll deceleration, and therefore inherently represent a substantial weight penalty in terms of their limited use in the life of the airframe.

It is the primary object of this invention to teach the use of integrated airframe-exhaust system structure for purposes of reducing overall airplane weight and to improve the installed aerodynamics by minimizing the base area, boattail, and interference drag.

It is a further object of this invention to teach the use of a structurally rigid and lightweight exhaust nozzle thrust vectoring system which can be used as a primary flight control, as in in-flight thrust reverser or modulator, or as a thrust reverser during landing.

It is a related object of this invention to teach the use of an exhaust nozzle passageway having a generally rectangular exit area for reduced base area, boattail, and interference drag, and incorporating a centrally disposed deformable plug means forward of the exit plane to control passageway area and shape to thereby maximize nozzle propulsive efficiency, and a movable plug means aft of the exit plane to allow asymmetrical or symmetrical thrust vectoring for flight control or for thrust reversal.

A further related object is to teach an exhaust nozzle concept for use with multi-jet propulsion engine aircraft in which the exhaust conduit for each engine defines a nozzle exit plane of fixed rectangular shape to permit the engines to be installed side-by-side with minimum nozzle drag, and which will allow the use of an integrated thrust vectoring system for two or more engines.

SUMMARY

The above objectives are each achieved in the preferred embodiment of this invention, which discloses an aircraft dual nozzle system for a pair of axi-symmetric jet engines located in the aircraft fuselage empennage region. The exhaust passageways of each engine terminate at a common exit plane and are each provided with a gradual shape change from a circular section near the engine to a rectangular section at the exit plane. An aerodynamically shaped plug means is located aft of the exit plane and is centrally disposed to extend across the path of the exiting gases from the engines. The plug means includes a pair of oppositely facing exterior surface means, each comprising a plurality of pivotally interconnected rigid panels movable to vary the flow pattern of the exiting gases thereby generating a thrust vector which will change the attitude of the aircraft for purposes of flight path management. Thrust modulation and/or reversal is achieved by synchronous movement of the pair of oppositely facing surface means. The disclosed nozzle system further includes nozzle area control means located forward of the exit plane and centrally disposed in the path of the gases in each engine passageway, comprising pivotally mounted area control panels which establish a desired minimum throat area, and pivotally mounted expansion control panels for independently changing the nozzle expansion shape and exit area while the throat area remains constant.

BRIEF DESCRIPTION OF THE DRAWINGS

FIG. 1 is a detailed cut-away isometric view of applicant's dual nozzle system, shown positioned for cruise flight.

FIG. 1A illustrates a twin-jet aircraft incorporating the dual nozzle system, with a full forward thrust vector schematically depicted by the exhaust stream positioned as shown.

FIG. 2 is an enlarged cross-section view through the dual nozzle system, showing details of the actuation systems.

FIG. 3 is a detailed isometric cut-away view of the nozzle system positioned for full reverse thrust.

FIG. 3A illustrates a twin-jet aircraft with the nozzle system generating full reverse thrust as indicated schematically by the position of the exhaust stream.

FIG. 4 shows the nozzle system asymmetrically positioned for thrust vectoring which will generate an unbalanced force component for in-flight maneuvering purposes.

FIG. 4A illustrates a twin-jet aircraft with the dual nozzle system positioned as in FIG. 4 for generating a downward force at the nozzle, as indicated by the path of the upper portion of the exhaust gas stream tube.

DESCRIPTION OF THE PREFERRED EMBODIMENT

The FIG. 1 isometric shows an integrated dual nozzle system comprising a separate exhaust passageway 1 for each engine. Each passageway 1 has a circular section near the engine and a smooth transition to a generally rectangular section at the nozzle exit plane, defined by the aft end portion of integrated structure 2. The exhaust passageways 1 for each engine terminate at a common exit plane, and in the case of a thrust augmented or after burning system are preferably provided with a conventional cooling air passage along the boundary wall 3. The rectangular exhaust exit plane permits a grouping of dual or multiple engines and exhaust passageways while minimizing base area, boattail, and interference drag. Centrally located in the path of the exhaust gases is a plug means 4 which comprises a forward plug 5 located within each engine passageway 1, and an aft plug thrust vector control system 25 located aft of the exit plane to serve both engines.

The forward plug 5 functions as a variable area nozzle and expansion control means and comprises a leading edge heat shield 6, throat area control panels 7, and expansion control panels 8. These items are supported by carry through structural members 9 and 10 which are attached to the sidewalls of passageway 1. In the case of thrust augmented engines, cooling air passageways are preferably provided along the surfaces of the plug means 4. Such cooling passageways can be fed a cooling medium from any convenient source, and could be interconnected with the cooling passageways of boundary wall 3.

As will become more apparent in the discussion connected with subsequent figures, the thrust vector control system 25 comprises a two-dimensional deformable plug centrally located in the exhaust stream aft of the exit plane and extending across the path of the gases exiting from both engines. The thrust vector control system 25 is supported at its forward end by structural means 26 and extends to a fixed trailing edge structural means 27. Positioned as shown, the thrust vector control system 25 is neutralized for full forward thrust; i.e., it forms a symmetrical aerodynamic continuation of each of the forward plugs 5 located in the engine passageways 1.

FIG. 1A illustrates a twin jet aircraft incorporating the dual nozzle. The exhaust stream is schematically depicted in the full forward thrust position for cruise or high speed flight. In the aircraft embodiment shown, the engines are placed side-by-side in the fuselage empennage region where the entire nozzle system may be integrally constructed as a continuation of the fuselage structure, thereby creating an extremely rigid and relatively lightweight structural system inherently capable of sustaining repeated loadings with minimum deformation.

FIG. 2 is an enlarged sectional view through the dual nozzle, showing the details of construction of the actuation system. A series of forward hinge fittings 11 are connected to structural member 9 to allow pivotal motion of area control panels 7 when forces are applied to the panels at aft hinge fittings 12 by a nozzle area control actuation system 13 which comprises connecting links 14, crank arms 15, pneumatic drive motors 16, power transfer synchronizing shafts 17, and a position feedback control (not shown) which is operably responsive to signals from the aircraft propulsion control system.

Forward hinge fittings 18 of the expansion control panels 8 are pivotally interconnected with the nozzle area control actuation system 13 at the aft hinges 12 of the area control panel 7. The expansion control panels 8 are connected to an expansion control actuation system 20 via aft hinge fittings 19. Expansion control actuation system 20 comprises floating connecting links 21, crank arms 22, a pneumatic drive motor 23, power transfer synchronizing shaft 24, and a position feedback control (not shown) which is operably responsive to the aircraft propulsion control system.

Minimum nozzle throat area is established by a synchronous outward rotation of the actuator crank arms 17 rotatably driving the nozzle area control panel 7 outwardly about the forward hinge fitting 11, upon command of the aircraft propulsion control system. Increased nozzle throat areas may be selectively achieved by an inward synchronous rotation of the actuation crank arms 15, reversing the aforementioned movements and collapsing the nozzle area control panels 7 to a desired throat area consistent with maximum propulsive efficiency.

It should be noted that the nozzle area control panel 7 and the expansion control panel 8 are operated independently to first achieve a desired throat area by rotation of panel 7, and then a desired expansion shape and exit area by rotation of panel 8 with respect to panel 7 in order to optimize the performance of the engine. The solid line position of expansion control panels 8 shown in FIG. 2 represent the maximum expansion, or closed position. For nozzle conditions requiring less expansion, the panels 8 may be rotated upon command of the propulsion control system to drive motor 23, which causes an outward rotation of crank arms 22 and consequent movement of links 21 to synchronously rotate panels 8 outwardly toward the dotted line positions shown.

As noted previously, the preferred embodiment of Applicant's multi-jet nozzle system utilizes separate variable area and expansion control means for each engine passageway, in combination with a single thrust vector control system 25 incorporated into the trailing portion of the dual function plug means 4. It should be apparent that this use of a single thrust vector control mechanism for a plurality of engines is inherently efficient from a weight and reliability standpoint. However, persons skilled in this art will realize that the optional provision of independent spaced apart thrust vector control systems for each engine would allow differential vectoring which could be used for flight control along all three major flight axes.

Thrust vector control system 25 as shown in FIG. 2 comprises a forward structural means 26, a fixed trailing edge structural means 27, a pair of pivot fittings 28 which independently mount upper and lower primary panels 29 for free rotation about structural means 26, an aft hinge fitting 32, upper and lower primary panels 29 for free rotation about structural means 26, an aft hinge fitting 32, upper and lower secondary panels 33, an integral rocker arm 34, secondary panel hinge 35, aft hinge fitting 36, upper and lower rocker bell cranks 37, upper and lower lip panels 38, integral rocker arms 39, lip panel hinge 40, floating connecting links 41; and an actuation system 42 which includes connecting links 43, crank arms 44, pneumatic drive motors 45, and power transfer synchronizing shafts 46.

Thrust vector control system 25 utilizes two separate actuation systems 42 with a position feedback control system (not shown), to provide for independent positioning of the oppositely facing surface means, each comprising a set of the pivotally interconnected rigid panels 29, 33, and 38. Upon command of the flight and propulsion control system the actuation systems 42 move panels 29, 33 and 38 to selected positions to change the path of exhaust gases flowing past the plug. Thrust modulation and/or reversal is achieved by synchronous symmetrical movement of the oppositely facing surface means into positions causing a symmetrical change in the flow pattern on each side of the plug, the dotted lines shown in FIG. 2 representing full reverse thrust positions. Thrust vectoring to generate a thrust vector having an unbalanced force component tending to change the attitude of the aircraft for flight path management is achieved by displacing one of the oppositely facing surface means with respect to the other surface means to thereby cause an asymmetrical flow path of the gases.

The oppositely facing surface means as shown are each independent and identical mechanical four-bar linkages with two rocker arms in series. A command of the aircraft flight and propulsion control system requesting symmetrical thrust modulation or reversal causes the actuation of drive motors 45 which induce a synchronous outward rotation and motion of crank arms 44 and connecting links 43, and rotate primary panels 29 about the centerline of structural means 26 in the direction of the dotted lines. The induced and combined rotary motion of rocker arms 34 due to the rotation of rocker bell crank 37 about trailing edge structural means 27 rotates the secondary panel 33 about the centerline of secondary panel hinge 35, thereby amplifying the angular displacement of secondary panel 33 and in turn raising the lip panel 38, induced by secondary panel 33. Rotation of lip panel 38 about the aft hinge fitting 36 and hinge point 40 is accomplished by means of the combined motion of floating link 41, bell crank 37, and rocker arm 39, inducing the lip panel 38 to rotate about hinge point 40.

A reverse mechanical motion will return the thrust vector control system surface means to the neutral or closed position shown in solid lines in FIG. 2. It should be noted that the mechanism is arranged such that in the event of a complete failure of an actuation system 42, the surface means will return to the neutral position. Should a partial actuation failure occur (as by failure of one of two actuator motors in parallel), the power transfer synchronizing shafts 40 will permit the system to operate at reduced rates.

FIG. 3 is a cut-away isometric view showing the thrust vector control system 25 positioned for full reverse thrust (the dotted line positions of FIG. 2). It is evident that the gases flowing on either side of forward plugs 5 will be turned by the rigid panel members 29, 33, and 38, to thereby reverse the direction of the thrust vector by 180° for purposes of aircraft deceleration. In contrast to most prior art reverser configurations used only during landing the disclosed vectoring system has been designed to allow thrust reversal while the aircraft is in flight, thereby providing increased flexibility for maneuvering purposes.

FIG. 3A illustrates the twin jet aircraft of FIG. 1A with the thrust vector control system positioned for reverse thrust, as in FIG. 3. The exhaust stream path can be seen to have been diverted to a forward direction over and under the empennage region of the aircraft fuselage.

FIG. 4 is a cut-away isometric showing the thrust vector control system positioned to deliver a thrust vector having an unbalanced force component tending to pitch the aircraft nose-up about its major pitch axis for purposes of flight path management or maneuvering. Upon command of the flight and propulsion control system, the upper surface means (panels 29, 33 and 38) have been displaced outwardly without disturbing the lower surface means from their neutral or forward thrust positions, as shown. This asymmetric operation results in a pitching moment which can be used as a primary flight control, either for instant maneuverability or to supplement or eliminate the requirement for conventional primary flight control surfaces.

FIG. 4A shows the twin-jet aircraft previously illustrated, with the thrust vector control system positioned to divert the path of the upper portion of the exhaust gases upwardly as shown, thereby generating a predetermined pitching moment acting upon the aircraft.

In light of the foregoing description, it should be apparent that the nozzle system of this invention offers many advantages over prior art systems. Some of these advantages are as follows: rigidity and reliability with reduced weight through integration of the exhaust system with basic airframe structure; the fixed rectangular nozzle exit plane allows any number of engines to be placed side by side without a nozzle base drag or boattail drag penality; improved installed nozzle performance through throat area and expansion area control; thrust vector modulation control independent of engine power level; symmetrical thrust vector control for modulation and reversal over a range of from 0° to 180° from the forward thrust position; asymmetrical thrust vector control over a range of from 0° to 180° for use as a primary flight control in flight path management for assisting ground roll rotation, thrust trimming the aircraft in cruise flight, a back-up pitch control, an in-flight thrust reverser for maneuvering, and as a thrust modulator at constant engine power settings for instant flight path response.

Certain advantages useful on a military mission are inherent in applicant's nozzle systems. Most prior art nozzle systems have relatively predominant and easily detected radar cross-sections and infrared signatures that are difficult to suppress, particularly from the rear. Applicant's nozzle with its centrally located plug dividing the exhaust stream tube, inherently provides a reduced unique and distinct infrared signature. The plug furnishes a large and easily cooled heat sink (e.g., cooling by ambient air scoops) to allow further reduction of the infrared signatures to potentially superior levels. In addition, the centrally disposed plug minimizes returning radar signals and the oblique surfaces of the plug deflect such signals away from their source. Also, the plug inherently provides increased nozzle surface areas for the addition of special surface materials which can be utilized to reduce either sound, radar, or infrared characteristics. Furthermore, applicant's plug means can be controlled to vary both the direction and intensity of these detection parameters to confuse detection devices. Therefore, in terms of infrared signature, radar cross-section, and sound suppression, the disclosed nozzle system provides distinct advantages over prior designs.

Many variations and modifications of the concepts disclosed will be apparent in light of the foregoing description. For example, the disclosed concepts have utility with single engines, horizontally or vertically stacked multiple engines, and afterburning or non-afterburning engines. The thrust vectoring control system 25 could be simplified to a rigid pivotable airfoil section if thrust modulation and reversal are not required; or it could be modified to provide for coordinated movement of the upper and lower surface means (29, 33 and 38) in the same direction by a first actuation system for thrust vectoring; and to provide for symmetrical movement by a second and independent actuation system for thrust modulation and reversal. The fixed trailing edge structural means 27 could be made movable, as part of the surface means, to further enhance the thrust vectoring characteristics. Also, as was mentioned earlier, the optional provision of at least two independent and separate thrust vectoring control systems, e.g., one for each of the two engines shown, would allow differential vectoring and modulation for direct thrust control of each of the three major flight axes for purposes of flight path management. It should be further noted that the forward plug 5 and the aft plug 25 could advantageously be pivotally interconnected between panels 8 and 29 near the exit plane to provide improved aerodynamic continuity and eliminate the small interim base area which arises when the area control panel 8 is in an outwardly disposed position. Additionally, for certain unusual flight conditions, the nozzle variable area and expansion control means of the forward plug 5 could be used to shift the location of the minimum throat area from the position established by area control panels 7, to the exit plane merely by continuing the outward rotation of expansion panels 8 past the dotted line position of FIG. 2. It should also be recognized by persons skilled in this art that the concepts disclosed may have application to vehicles other than aircraft, and propulsive fluid mediums other than air. Accordingly, it is intended that the appended claims cover any such variations or modifications.

What is claimed and desired to be secured by U.S. letters patent is:

1. An engine exhaust nozzle system for use in combination with a jet engine and a vehicle having a directional control system; said system having a passageway defining a generally rectangular section near the exit plane of the exhaust gases and a thrust vector control means for selectively establishing a total resultant thrust vector with an unbalanced force component normal to the direction of flow of the gases approaching said exit plane comprising: plug means extending aft of said exit plane and centrally disposed in the path of the gases exiting said passageway and having a pair of oppositely facing surface means each of which includes a primary panel independently mounted for rotation with respect to said passageway and a secondary panel pivotally mounted on said primary panel near the trailing edge thereof, and a pair of independent actuation means for independently moving each of said surface means with respect to the other of said surface means to thereby asymmetrically change the external contour and shape of said plug means and change the direction of flow of said exhaust gases; wherein said thrust vector control means is responsive to said directional control system to selectively establish a thrust vector having an unbalanced force component tending to rotate said vehicle about one of its major axes for purposes of directional control of said vehicle.

2. The system of claim 1 which additionally includes lip panels pivotally attached to said secondary panels near the trailing edge thereof, and wherein reverse thrust may be achieved by synchronous movement of each of said independent actuation means to symmetrically displace corresponding pairs of said primary, secondary, and lip panels of said oppositely facing surface means into positions wherein the gases are turned through an increasingly greater angle as they pass over each of the pivotally interconnected panels.

3. The system of claim 1 which additionally includes variable area nozzle control means located on said plug means forward of said exit plane comprising: a pair of oppositely facing area control panels each pivotally mounted near a forward edge, and means for concurrently and synchronously rotating said area control panels to thereby change the minimum area of said passageway.

4. The system of claim 3 which additionally includes a pair of oppositely facing expansion control panels each pivotally attached to a respective one of said area control panels, and means for concurrently and synchronously rotating said expansion control panels with respect to said area control panels.

5. In combination with a jet engine and a control system; an exhaust nozzle passageway having a generally rectangular section near the exit plane of the exhaust gases; deformable plug means attached to opposite walls of said passageway and centrally disposed in the path of the exhaust gases forward of said exit plane; said plug means comprising means for varying the throat area between said plug means and a wall of said passageway and independent means for changing the shape and exit area of said passageway while said throat area remains constant; wherein said means for varying the throat area within said passageway comprises: a pair of oppositely facing area control panels each pivotally mounted near a forward edge, and means for concurrently and synchronously rotating said area control panels to thereby change the area of said passageway; wherein said means for changing the shape and exit area of said passageway comprises: a pair of oppositely facing expansion control panels each pivotally attached to a respective one of said area control panels, and means for concurrently and synchronously rotating said expansion control panels with respect to said area control panels; and wherein said deformable plug means is responsive to said control system to selectively establish a desired nozzle passageway throat area, expansion shape, and exit area for maximum propulsive efficiency.

6. In combination with a vehicle having a jet engine and a control system: an engine exhaust nozzle passageway which defines a generally rectangular section near the exit plane of the exhaust gases; thrust vector control means for selectively establishing a resultant thrust vector which has an unbalanced force component normal to the direction of flow of the exhaust gases at said exit plane comprising: plug means extending aft of said exit plane and centrally disposed in the path of the gases exiting said passageway, said plug means comprising a pair of oppositely facing surface means, each having a plurality of pivotally interconnected panels defining the external contour of said plug; means for moving said surface means to thereby change the direction of flow of at least a portion of said exhaust gases; variable area nozzle control means responsive to said control system centrally located in said passageway forward of said exit plane comprising: means for varying the minimum throat area within said passageway, and means for changing the shape and exit area of said passageway while said throat area remains constant; wherein said means for varying the minimum throat area within said passageway comprises: a pair of oppositely facing area control panels each pivotally mounted near a forward edge, and means for concurrently and synchronously rotating said area control panels to thereby change the minimum area of said passageway; wherein said means for changing the shape and exit area of said passageway comprises: a pair of oppositely facing expansion control panels each pivotally attached to a respective one of said area control panels, and means for concurrently and synchronously rotating said expansion control panels with respect to said area control panels; wherein said thrust vector control means includes means for thrust modulation and thrust reversal by movement of said pair of oppositely facing surface means into positions causing a symmetrical change in the direction of flow of the exhaust gases passing on each side of said plug; and wherein said thrust vector control means is responsive to said control system to selectively establish a thrust vector having an unbalanced force component tending to rotate the vehicle about one of its major axes for purposes of directional control of said vehicle.

* * * * *

UNITED STATES PATENT OFFICE
CERTIFICATE OF CORRECTION

Patent No. 3,774,868     Dated November 27, 1973

Inventor(s) GERALD F. GOETZ

It is certified that error appears in the above-identified patent and that said Letters Patent are hereby corrected as shown below:

On the cover sheet, insert -- [73] Assignee: The Boeing Company, Seattle, Washington, a corporation of Delaware --.

Signed and sealed this 6th day of August 1974.

(SEAL)
Attest:

McCOY M. GIBSON, JR.       C. MARSHALL DANN
Attesting Officer      Commissioner of Patents